(12) United States Patent
Walmsley et al.

(10) Patent No.: US 8,186,157 B2
(45) Date of Patent: May 29, 2012

(54) SUPERCHARGING SYSTEM

(75) Inventors: Timothy John Walmsley, Rivervale (AU); Jude Benedict Upton, Malaga (AU); Carl Carisbrook Henry, Mount Lawley (AU); Derek Alfred Gobby, Caversham (AU)

(73) Assignee: Sprintex AustraLASIA Pty Ltd, Western (AU)

( * ) Notice: Subject to any disclaimer, the term of this patent is extended or adjusted under 35 U.S.C. 154(b) by 834 days.

(21) Appl. No.: 12/278,640

(22) PCT Filed: Feb. 9, 2006

(86) PCT No.: PCT/AU2006/000174
§ 371 (c)(1),
(2), (4) Date: Dec. 15, 2008

(87) PCT Pub. No.: WO2007/090223
PCT Pub. Date: Aug. 16, 2007

(65) Prior Publication Data
US 2009/0301079 A1    Dec. 10, 2009

(51) Int. Cl.
*F02D 23/00*    (2006.01)
*F02B 33/28*    (2006.01)
*F02B 29/02*    (2006.01)
(52) U.S. Cl. .................... 60/600; 60/611; 123/559.1
(58) Field of Classification Search ............ 123/559.1, 123/561; 60/600, 611
See application file for complete search history.

(56) References Cited

U.S. PATENT DOCUMENTS

| | | | | |
|---|---|---|---|---|
| 4,402,297 A | * | 9/1983 | Hyodo et al. | 123/591 |
| 4,422,416 A | * | 12/1983 | Bernardoni | 123/184.54 |
| 4,608,828 A | | 9/1986 | Mikota | |
| 4,817,387 A | * | 4/1989 | Lashbrook | 60/611 |
| 4,945,864 A | * | 8/1990 | Solomon et al. | 123/41.39 |
| 4,955,333 A | * | 9/1990 | Klomp | 123/73 AC |
| 5,056,309 A | * | 10/1991 | Linder et al. | 60/278 |
| 5,372,108 A | * | 12/1994 | Wu | 123/311 |
| 6,568,376 B2 | * | 5/2003 | Sonnleitner et al. | 123/559.1 |
| 7,040,304 B2 | * | 5/2006 | Kassner | 123/565 |

FOREIGN PATENT DOCUMENTS

| | | |
|---|---|---|
| GB | 2 021 196 A | 11/1979 |
| JP | 0242124 | 2/1990 |
| JP | 11229884 | 8/1999 |
| JP | 2000154729 | 6/2000 |
| WO | WO 099/1447 A | 3/1999 |

* cited by examiner

*Primary Examiner* — Burton Mullins
(74) *Attorney, Agent, or Firm* — Nikolai & Mersereau, P.A.; Thomas J. Nikolai

(57) ABSTRACT

A supercharging system (40) is disclosed which comprises a supercharging device (28) having at least one inlet port (42) and at least one outlet port (44), and at least one idle valve (30) in fluid communication with the supercharging device (28). The idle valve (30) is disposed adjacent the outlet port (44) and is arranged to selectively restrict fluid flow during use in a direction through the idle valve (30) towards the supercharging device (28). A corresponding supercharging kit and an internal combustion engine including a supercharging system are also disclosed.

13 Claims, 3 Drawing Sheets

SUPERCHARGING SYSTEM

FIELD OF THE INVENTION

The present invention relates to a supercharging system for an internal combustion engine and, in particular, to a supercharging system for use with high performance engines of the type having a long inlet valve opening duration.

BACKGROUND OF THE INVENTION

It is known to provide an internal combustion engine with a supercharging device which acts to increase the density of air for combustion in cylinders of the engine and thereby improve fuel burning efficiency and engine power.

A known supercharging arrangement 10 is shown in FIG. 1. The supercharging arrangement 10 is associated with one or more cylinders 12, each of which houses a piston 14 movable during use towards and away from a head portion 16 of the cylinder 12. An inlet valve 18 and an outlet valve 20 are included for controlling flow of gases into and out of the cylinder 12, the inlet valve being associated with an inlet conduit 22 and the outlet valve 20 being associated with an outlet conduit 24.

The supercharging arrangement 10 also includes a conventional throttle valve 26 arranged to control flow of air into the cylinder 12 and thereby the power generated by the cylinder 12.

Disposed between the throttle valve 26 and the cylinder 12 in line with the inlet conduit 22 is a supercharging device 28 which may be of any type, such as a screw type supercharger having a pair of intermeshing helical screw members.

During use, the supercharging device 28 controllably increases the flow rate of air into the cylinder 12 and in this way increases the density of air in the cylinder 12 and the power provided by the cylinder 12, with the amount of air available to the supercharging device 28 being controlled by the throttle valve 26.

While this arrangement works well for conventional performance vehicles and for high performance vehicles at elevated rpm, the arrangement generally does not operate well for high performance vehicles at relatively low rpm.

Without wishing to be bound by theory, the inventors of the present invention believe that the reason for poor performance of a supercharging arrangement of the type shown in FIG. 1 for high performance vehicles at relatively low rpm is because high performance vehicles generally have a relatively long inlet valve opening duration which causes both the inlet valve 18 and the outlet valve 20 to be simultaneously open at certain times and the inlet valve 18 to be open at the beginning of a compression stroke. At relatively low engine rpm the pressure of air passing through the inlet conduit 22 in the direction of arrows A is sufficiently low that gases in the cylinder 12 are able to pass back into the inlet conduit 22 in the direction of arrow B. This causes a significant reduction in the amount of oxygen available for combustion in the cylinder 12 and a reduction in power produced by the cylinder 12. It also prevents the engine from idling smoothly. At elevated rpm, the pressure of air traveling the direction of arrows A is sufficiently high that gases in the cylinder 12 are not able to pass back into the inlet conduit 22 even though both the inlet valve 18 and the outlet valve 20 are open.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

SUMMARY OF THE INVENTION

In accordance with a first aspect of the present invention, there is provided a supercharging system comprising:
   a supercharging device having at least one inlet port and at least one outlet port; and
   at least one idle valve in fluid communication with the supercharging device, the idle valve being disposed adjacent the outlet port and being arranged to selectively restrict fluid flow during use in a direction through the idle valve towards the supercharging device.

In one arrangement, the idle valve is integrally formed with the supercharging device. In an alternative arrangement, the idle valve is separate from and connectable to the supercharging device.

In one embodiment, the idle valve is a one way valve arranged to permit fluid flow from the supercharging device through the idle valve and to restrict fluid flow through the idle valve to the supercharging device.

In one embodiment, the idle valve is a butterfly valve. In an alternative embodiment, the idle valve is a reed valve.

The idle valve may include at least one aperture arranged to allow an amount of air sufficient for engine idling to pass through the idle valve when the idle valve is in a closed state. The idle valve may include an idle valve member movable between a closed position and an open position and each aperture may be disposed adjacent an end of the idle valve member. In one embodiment, two apertures are provided.

The system may further comprise a fluid bypass mechanism arranged to selectively permit or restrict fluid flow from the inlet port of the supercharging device to the outlet port of the supercharging device so as to thereby allow fluid to bypass the supercharging device during an idling engine condition or a relatively low engine load condition.

The bypass arrangement may include a bypass conduit and a bypass valve which may be a butterfly valve.

The system may further be arranged so as to control the position of the idle valve and/or the bypass valve in response to input from a user and/or input from at least one sensor.

In one arrangement, the position of the idle valve member is controlled in response to user actuation of an engine throttle, in response to an acceleration sensor, or in response to a pressure sensor.

In one arrangement, the position of the bypass valve member is controlled in response to user actuation of an engine throttle, in response to an acceleration sensor, or in response to a pressure sensor.

In accordance with a second aspect of the present invention, there is provided a supercharging kit for an internal combustion engine, the kit comprising:
   a supercharging device having at least one inlet port and at least one outlet port; and
   at least one idle valve integral with or connectable to the supercharging device such that the idle valve is in fluid communication with the supercharging device and the idle valve is disposed adjacent the outlet port, the idle valve being arranged to selectively restrict fluid flow during use in a direction through the idle valve towards the supercharging device.

In accordance with a third aspect of the present invention, there is provided an internal combustion engine comprising:
   a supercharging device having at least one inlet port and at least one outlet port; and at least one idle valve connected in fluid communication with the outlet port of the supercharging device and between the supercharging device and at least one cylinder of the engine, the idle valve being arranged to selectively restrict fluid flow during use in a direction from the at least one cylinder through the idle valve towards the supercharging device.

DESCRIPTION OF THE DRAWINGS

The present invention will now be described, by way of example only, with reference to the accompanying drawings, in which.

DESCRIPTION OF THE EMBODIMENT OF THE INVENTION

Figure 1:
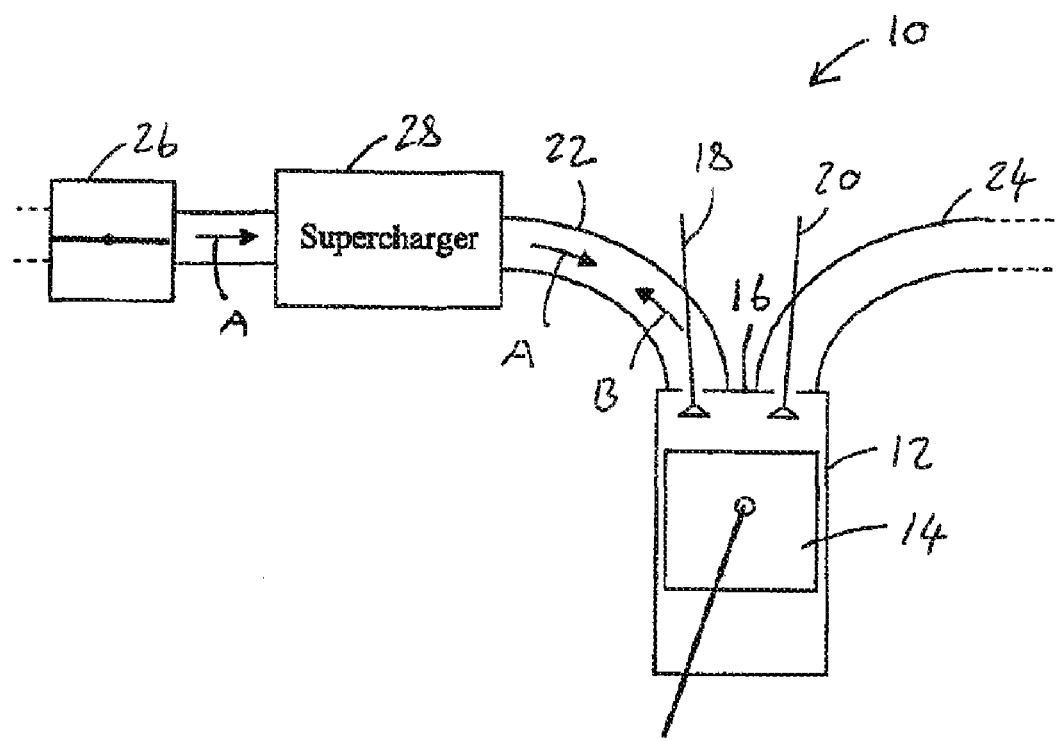
FIG. 1 is a schematic diagram of a prior art supercharging arrangement.
Figure 2:
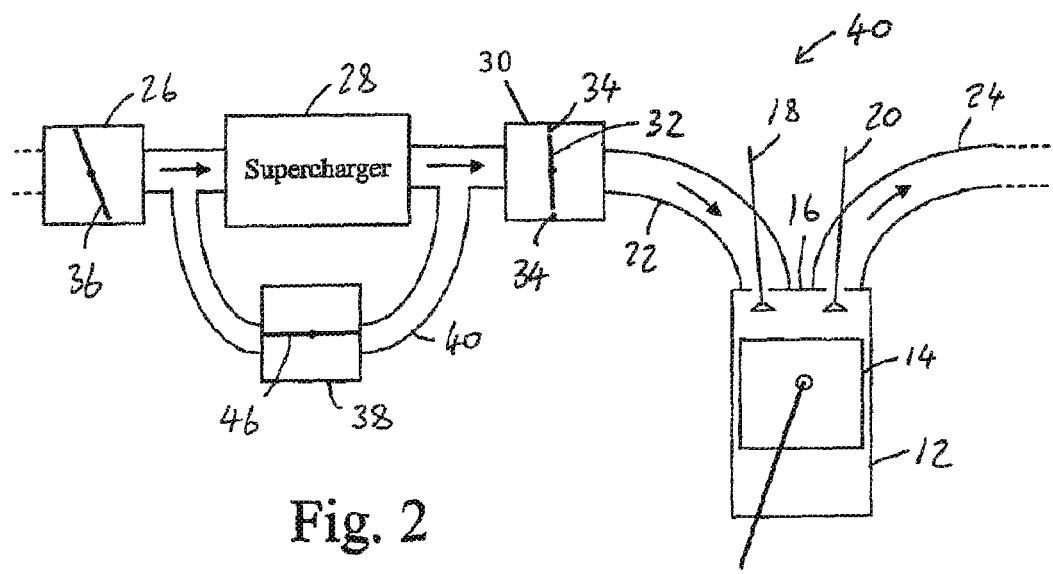
FIG. 2 is a schematic diagram of a supercharging system in accordance with an embodiment of the present invention with the supercharging system shown during use in an idle condition.
Figure 3:
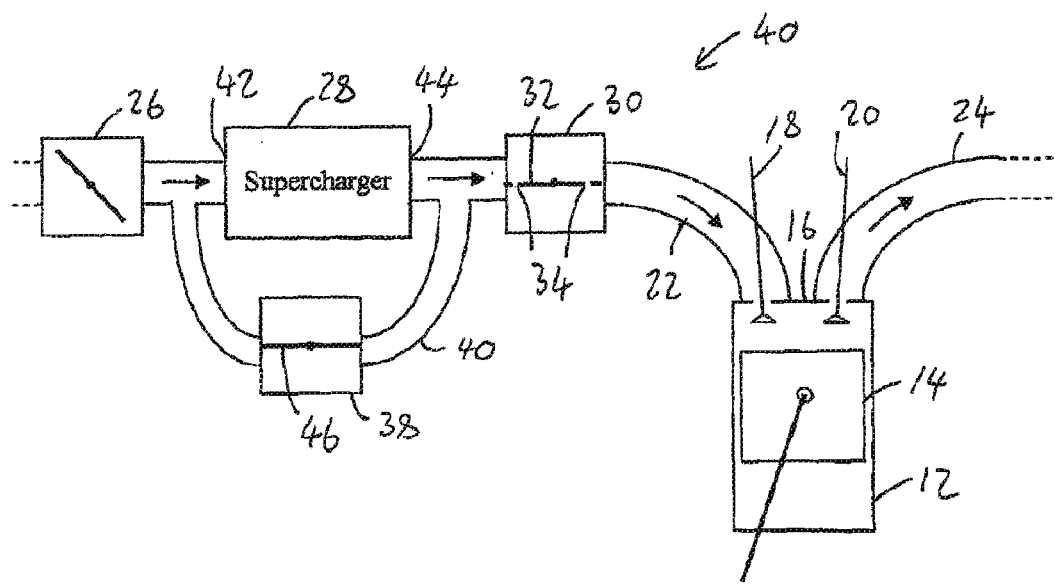
FIG. 3 is a schematic diagram of the supercharging system shown in FIG. 2 with the system shown during use in a light load condition.
Figure 4:
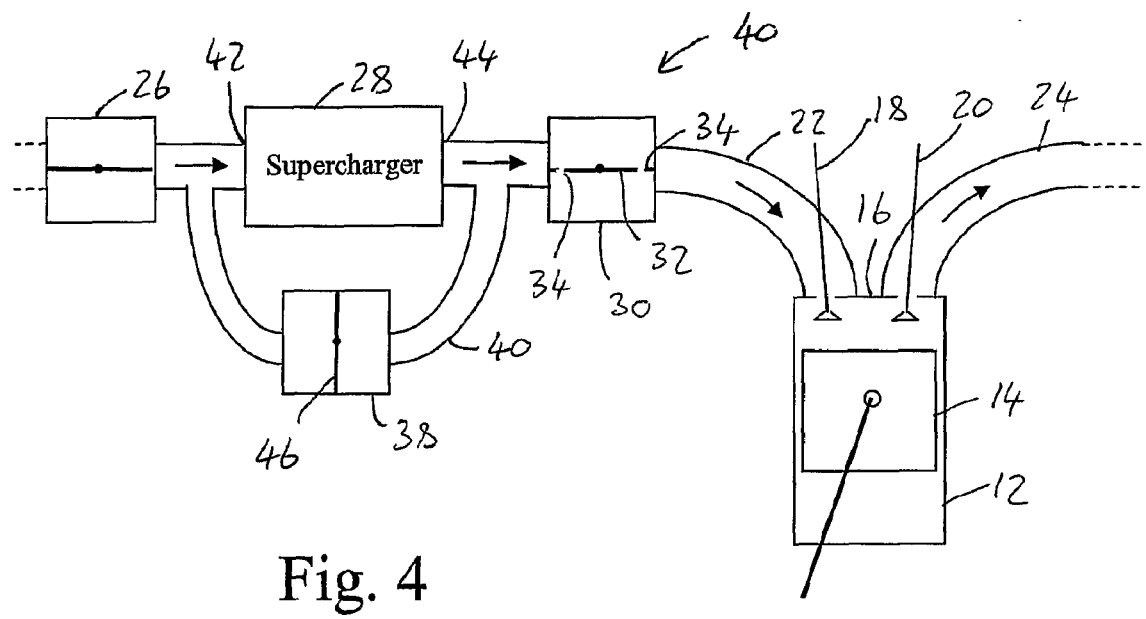
FIG. 4 is a schematic diagram of the supercharging system shown in FIGS. 2 and 3 with the system shown during use in a high load condition.

Referring to FIGS. 2 to 4 of the drawings, there is shown a supercharging system 40 in accordance with an embodiment of the present invention, with the supercharging system 40 shown incorporated into a conventional internal combustion engine. The system 40 includes features similar to features shown in the prior art supercharging system 10 shown in FIG. 1 and, accordingly, like features are indicated with like reference numerals.

The supercharging system 40 includes an idle valve 30 disposed in line with an inlet conduit 22 between a supercharging device 28 and a cylinder 12. In a preferred embodiment, each cylinder 12 has an associated idle valve 30, although it will be understood that other arrangements are possible. For example, one idle valve 30 may be provided for all cylinders 12.

In the present example, the internal combustion engine which includes the present supercharging system 40 is a high performance V-twin motorcycle engine arranged so as to run at relatively high rpm, and which includes a relatively long inlet valve opening duration. As a consequence, at certain instances both the inlet valve 18 and the outlet valve 20 are open, the inlet valve is open at the beginning of a compression stroke, and the engine is prone to backflow of air from the cylinders 12 to the inlet conduits 22.

The idle valve 30 in this example is of butterfly valve type and includes an idle valve member 32 which is rotatable between a closed position as shown in FIG. 2 and a fully open position as shown in FIGS. 3 and 4. In this example, the idle valve member 32 includes at least one aperture so that a relatively small amount of air is able to pass through the idle valve 30 to the chamber 12 even when the idle valve 30 is in a closed state. In the present example, two apertures are provided, each aperture being disposed adjacent an end of the idle valve member 32.

In order to ensure that the idle valve 30 performs the desired function, in this example the position of the valve member 32 is controlled using an appropriate actuator and an Engine Control Unit (ECU) arranged to control the actuator and thereby the position of the idle valve member 32 in response to one or more sensors associated with the vehicle. For example, the position of the idle control valve may controlled in response to user actuation of a vehicle throttle, in response to an acceleration sensor, in response to a pressure sensor disposed in the inlet conduit 22, and so on.

Figure 5:
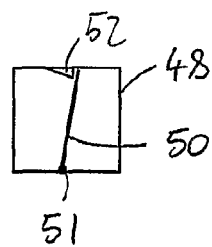
FIG. 5 is a diagrammatic representation of an alternative idle valve for use with the supercharging system shown in FIGS. 2 to 4.

It will be understood that the function of the idle valve 30 is to restrict flow of gases from the cylinder to the inlet conduit 22 at relatively low rpm, and to not restrict flow of gases between the inlet conduit 22 and the cylinder 12 at relatively high rpm. As such, any suitable idle valve which is able to perform this function is envisaged. For example, as shown in FIG. 5, an alternative idle valve 48 may take the form of a reed valve, the idle valve 48 including a valve member 50 pivotably movable about a pivot connection 51 towards and away from a stop member 52. With the alternative idle valve 48, it will be understood that operation is automatic in that the idle valve 48 operates as a one way valve and the degree of opening of the idle valve 48 will depend on the pressure of air flowing through the idle valve 48. As such, a control mechanism for the idle valve 48 is not necessary.

As with a conventional engine, a throttle valve 26 is disposed upstream of the supercharger 28, the throttle valve 26 having a throttle valve member 36 movable between a closed position and a fully open position as shown in FIGS. 2 to 4 so as to modify the amount of air provided to the chamber 12 for combustion and thereby the amount of power produced by the engine. It will be appreciated that the position of the throttle valve member 36 may be controlled in response to user input, for example in response to user actuation of a throttle.

The present example also includes a bypass valve 38, in this example a butterfly valve type, the bypass valve 38 being disposed in line with a bypass conduit 40 extending between inlet and outlet ports 42 and 44 respectively of the supercharging device 28. The bypass valve 38 includes a bypass valve member 46 which is movable between a closed position as shown in FIG. 4 and an open position as shown in FIGS. 2 and 3.

The bypass valve 38 and the bypass conduit 40 serve to cause air passing through the throttle valve 26 to bypass the supercharging device 28 when the engine is operating in an idle condition or is experiencing a relatively light load. This assists in minimizing unnecessary work carried out by the supercharging device 28 at relatively low rpm when additional engine power is not needed.

It will be appreciated that the position of the bypass valve may be controlled in response to information received from vehicle sensors, which may be the same as or different to the vehicle sensors used to actuate the idle valve 30.

During use, when the engine including the supercharging device 40 is operating in an idle condition as shown in FIG. 2, the throttle valve 26 is disposed in a slightly open position so as to allow a relatively small amount of air to pass through the throttle valve 26, and the bypass valve 38 is disposed in a fully open position so as to permit air passing through the throttle valve 26 to bypass the supercharging device 28. Also, the idle valve 30 is disposed in a fully closed position, the idle valve 30 allowing only a relatively small amount of air to pass through the idle valve 30 by virtue of the apertures 34.

It will be understood that the presence of the closed idle valve 30 between the supercharging device 28 and the cylinder 12 will substantially prevent backflow of gases from the cylinder 12 to the inlet conduit 22 during use even though the inlet valve 18 and the outlet valve 20 are both open and the inlet valve 18 is open during the initial stage of a compression stroke, because the idle valve member 32 presents a significant resistance to air flow. As a consequence, sufficient oxygen density will be maintained in the cylinder 12 during an idling condition, engine power will be maintained, and the engine will idle smoothly at relatively low rpm.

During a relatively light load condition as shown in FIG. 3, the throttle valve 26 is disposed in a slightly more open position than in the idle condition, the bypass valve 28 is disposed in a fully open position so as to allow air from the inlet valve 26 to bypass the supercharging device 28, and the idle valve 30 is disposed in a fully open position. Since sufficient pressure is produced by air flowing through the inlet conduit 22 to overcome the back pressure in the cylinder 12, the resistance to backflow provided when the idle valve 30 is in the fully closed position is not required.

The situation is similar when the engine including the supercharging system 40 is operating at a relatively high load condition in that the pressure generated by air flowing through the inlet conduit 22 is sufficiently high to overcome back pressure in the cylinder 12. As with the light load condition shown in FIG. 2, the idle valve 30 is disposed in a fully open position. The throttle valve 26 is also disposed in a fully open position so as to maximize the amount of oxygen passing through the throttle valve 26, and the bypass valve 38 is disposed in a fully closed position so that air does not pass through the bypass valve 38 and the bypass conduit 40 and instead passes through the supercharging device 28. The supercharging device 28 increases the flow rate of air to the cylinder 12 and thereby the density of oxygen in the cylinder 12 and the combustion efficiency and power.

Modifications and variations as would be apparent to a skilled addressee are deemed to be within the scope of the present invention.

The invention claimed is:

1. A supercharging system comprising:
    a supercharging device having at least one inlet port and at least one outlet port; and
    at least one idle valve in fluid communication with the supercharging device, the idle valve being disposed adjacent the outlet port and being arranged to selectively restrict fluid flow during use in a direction through the idle valve towards the supercharging device, wherein the idle valve includes an idle valve member movable between a closed position and an open position, the idle valve member including at least one aperture arranged to allow an amount of air sufficient for engine idling to pass through the idle valve when the idle vale is in a closed state.

2. A supercharging system as claimed in claim 1, wherein the idle valve is integrally formed with the supercharging device.

3. A supercharging system as claimed in claim 1, wherein the idle valve is separate from and connectable to the supercharging device.

4. A supercharging system as claimed in claim 1, wherein the idle valve is a one way valve arranged to permit fluid flow from the supercharging device through the idle valve and to restrict fluid flow through the idle valve to the supercharging device.

5. A supercharging system as claimed in claim 1, wherein the idle valve is a butterfly valve.

6. A supercharging system as claimed in claim 1, wherein the idle valve is a reed valve.

7. A supercharging system as claimed in claim 1, wherein each aperture is disposed adjacent an end of the idle valve member.

8. A supercharging system as claimed in claim 1, wherein the system is arranged so as to control the position of the idle valve member in response to input from a user and/or input from at least one sensor.

9. A supercharging system as claimed in claim 1, further comprising a fluid bypass mechanism arranged to selectively permit or restrict fluid flow from the inlet port of the supercharging device to the outlet port of the supercharging device so as to selectively allow fluid to bypass the supercharging device during use.

10. A supercharging system as claimed in claim 9, wherein the bypass arrangement includes a bypass conduit and a bypass valve having a bypass valve member movable between an open position and a closed position.

11. A supercharging system as claimed in claim 10, wherein the position of the bypass valve member is controlled in response to input from a user and/or input from at least one sensor.

12. A supercharging kit for an internal combustion engine, the kit comprising:
    a supercharging device having at least one inlet port and at least one outlet port; and
    at least one idle valve integral with or connectable to the supercharging device such that the idle valve is in fluid communication with the supercharging device and the idle valve is disposed adjacent the outlet port, the idle valve being arranged to selectively restrict fluid flow during use in a direction through the idle valve towards the supercharging device,
    wherein the idle valve includes an idle valve member movable between a closed position and an open position, the idle valve member including at least one aperture arranged to allow an amount of air sufficient for engine idling to pass through the idle valve when the idle valve is in a closed state.

13. An internal combustion engine comprising:
    the supercharging system of claim 1, wherein the supercharging system is arranged to be
    in fluid communication with at least one cylinder of the internal combustion engine.

* * * * *